Figure 9:
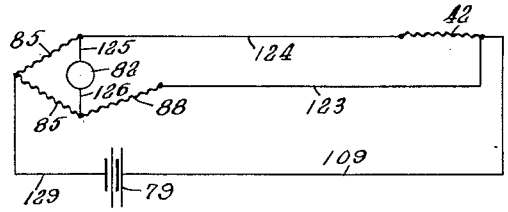

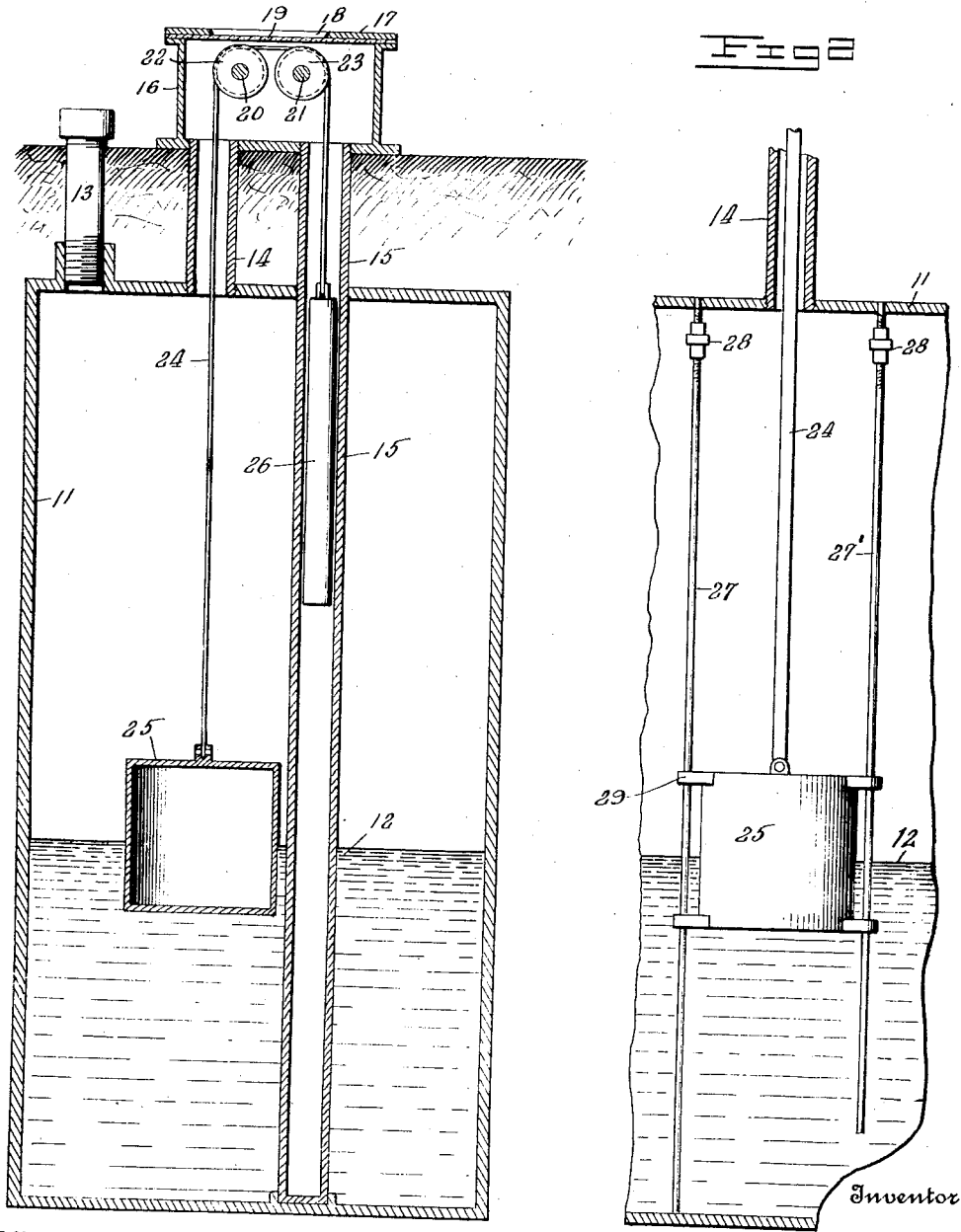

A. J. SMITH.
TELEMETRIC SYSTEM.
APPLICATION FILED JUNE 3, 1912.
1,208,026.
Patented Dec. 12, 1916.
5 SHEETS—SHEET 2.
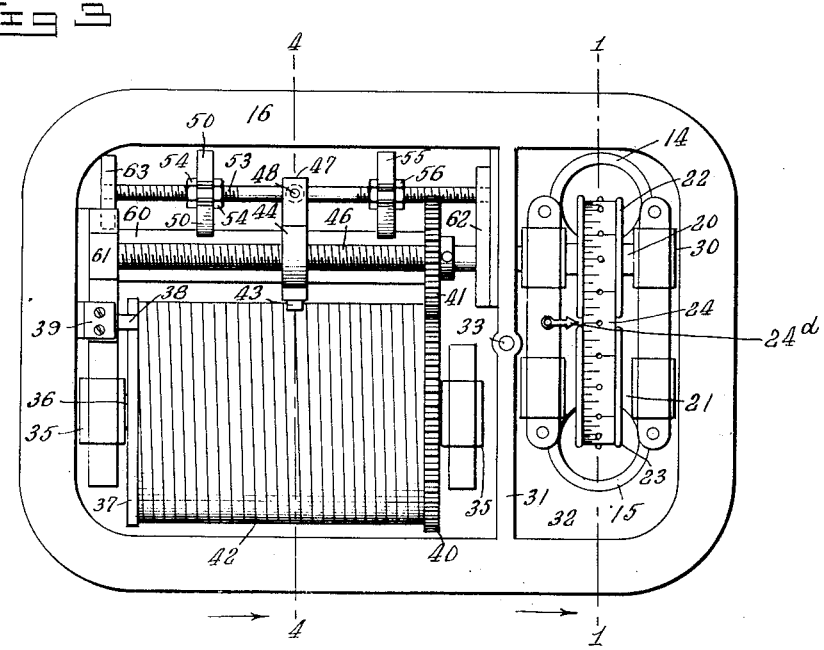
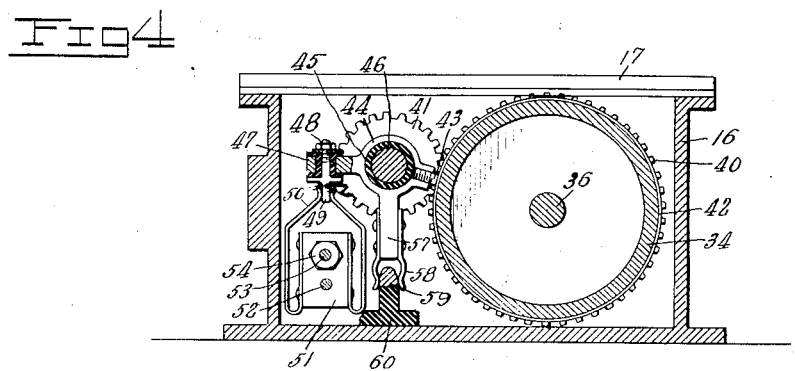
Witnesses
H. G. Robinette
Walton Harrison
Inventor
A. J. Smith
By Lucyus Lushman Rea
Attorney A. J. SMITH.
TELEMETRIC SYSTEM.
APPLICATION FILED JUNE 3, 1912.
1,208,026.
Patented Dec. 12, 1916.
5 SHEETS—SHEET 3.
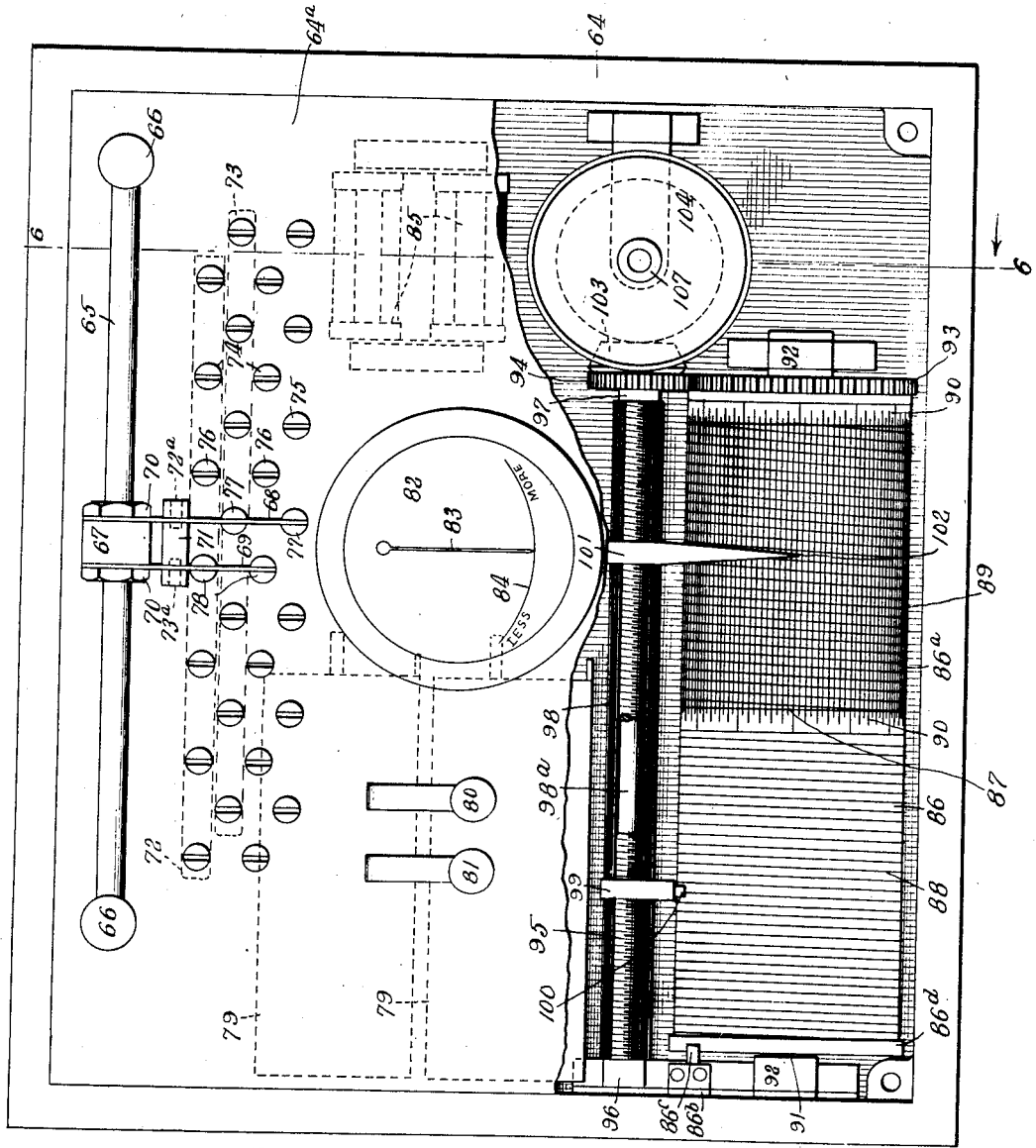
Witnesses
H. L. Robnick
Walton Harrison
Inventor
A. J. Smith
By [signature]
Attorney A. J. SMITH.
TELEMETRIC SYSTEM.
APPLICATION FILED JUNE 3, 1912.
1,208,026.
Patented Dec. 12, 1916.
5 SHEETS—SHEET 4.
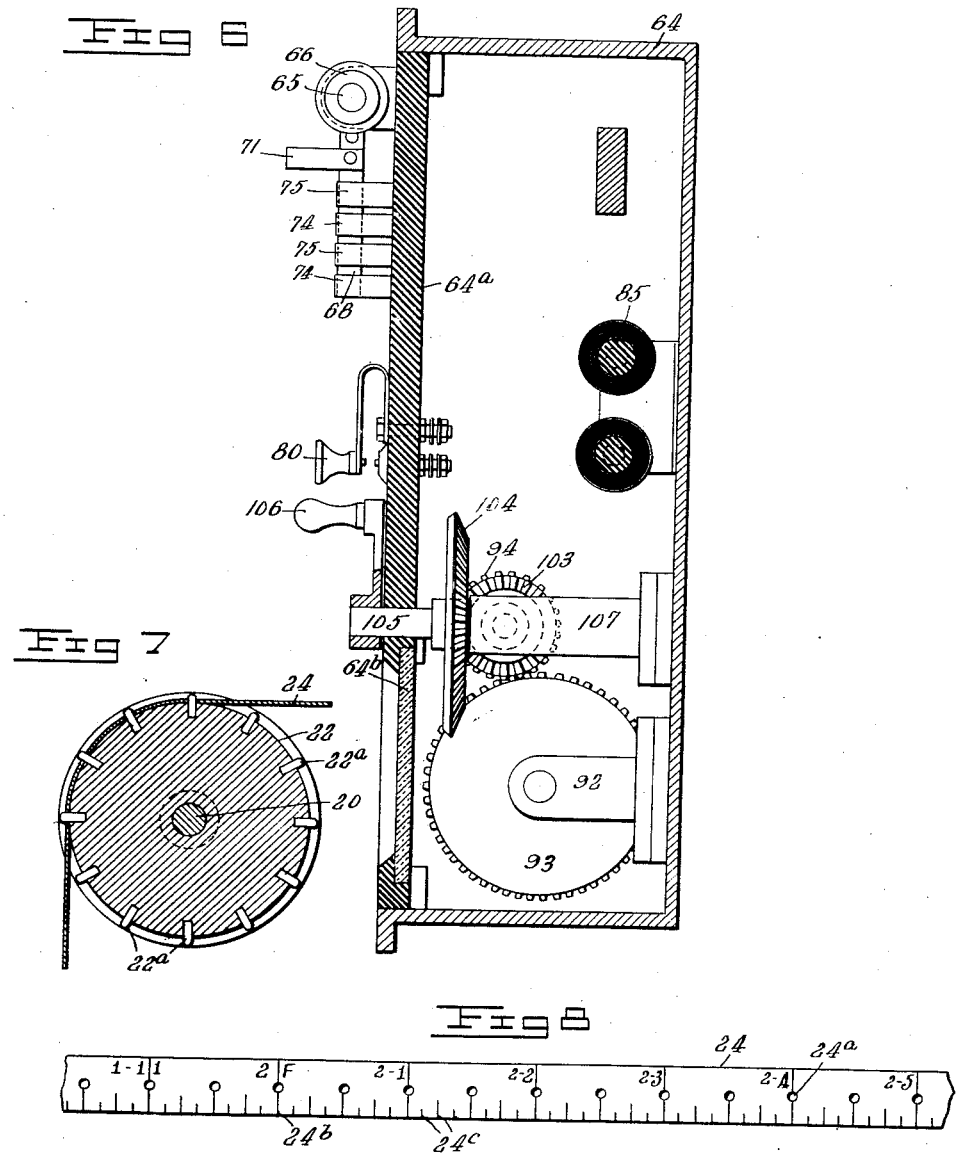
Witnesses
H. G. Polnietts
Walton Harrison
Inventor
A. J. Smith
By [signature]
Attorney

A. J. SMITH.
TELEMETRIC SYSTEM.
APPLICATION FILED JUNE 3, 1912.

1,208,026.

Patented Dec. 12, 1916.
5 SHEETS—SHEET 5.

Witnesses

Inventor
A. J. Smith
By
Attorney

UNITED STATES PATENT OFFICE.

ARTHUR J. SMITH, OF BATH, MAINE.

TELEMETRIC SYSTEM.

1,208,026.   Specification of Letters Patent.   Patented Dec. 12, 1916.

Application filed June 3, 1912. Serial No. 701,259.

*To all whom it may concern:*

Be it known that I, ARTHUR J. SMITH, a citizen of the United States, residing at Bath, in the county of Sagadahoc and State of Maine, have invented new and useful Improvements in Telemetric Systems, of which the following is a specification.

My invention relates to means for determining depths of one or more bodies of liquid located at a distance from the point where the reading or indications of such depths are to be made.

More particularly stated, my invention comprehends electric wiring extending from a receiving or indicating station to various other points where the liquids to be measured are located, and means controllable at the will of the operator located at the receiving or indicating station for determining at will the depth of any particular body of liquid independently of the other bodies thereof.

My invention further comprehends various improvements in the system and apparatus used for transmitting and receiving the indications.

Generally speaking, I employ at each of the transmitting stations a float controlled electrical transmitting device which automatically varies the ohmic resistance of a circuit leading to the receiving station and at the receiving station I employ a receiving instrument comprising a manually operated resistance and a Wheatstone bridge or equivalent balancing device in connection with a galvanometer or other appropriate indicator for determining primarily how much resistance must be thrown into the circuit in order to balance the resistance thrown in automatically at the transmitting station; and for enabling the operators to determine, by direct reading in feet, inches and small fractions of an inch the depth of liquid, the measurement of the latter being related to and derived directly from the electrical condition of the circuit.

Reference is made to the accompanying drawing forming a part of this specification, and in which like reference characters indicate like parts.

Figure 10:
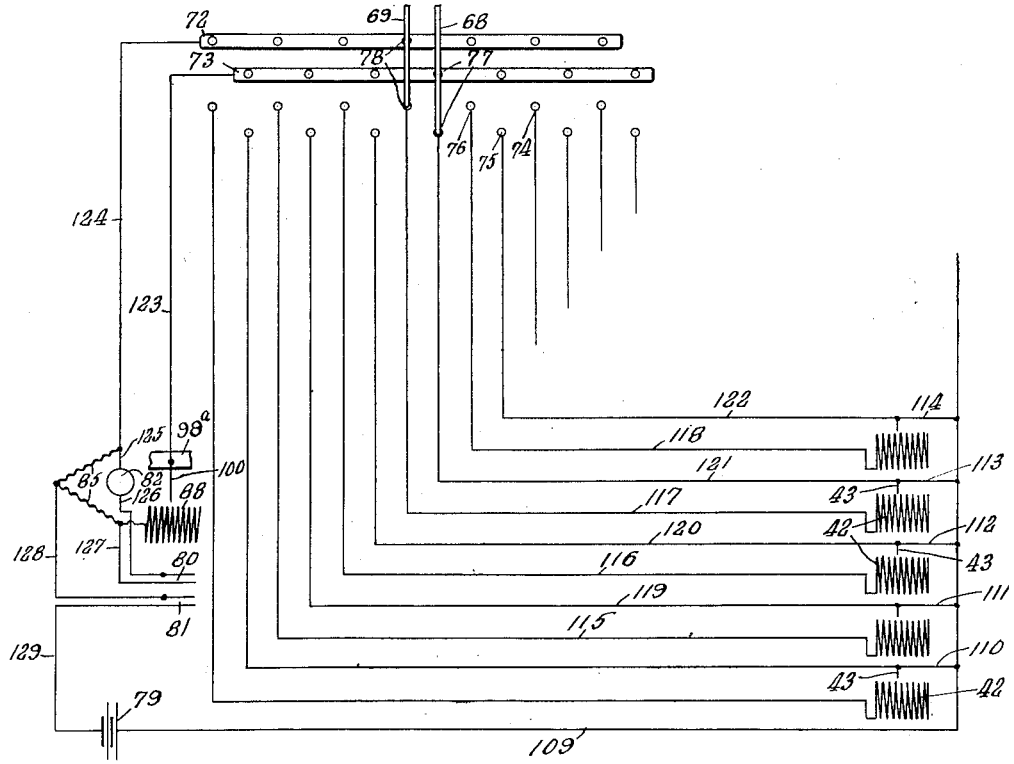

Figure 1 is a vertical section through the mechanism at the transmitting station where the liquid to be measured is located, and is taken on the line 1—1 of Fig. 3, looking in the direction of the arrow. Fig. 2 is a detail showing in fragmentary section, at a right angle to the section shown in Fig. 1, the float and parts immediately associated therewith. Fig. 3 is a plan view of the casing and mechanism contained therein, shown at the top of Fig. 1. Fig. 4 is a vertical section on the line 4—4 of Fig. 3, looking in the direction of the arrow. Fig. 5 is a view partly in front elevation and partly broken away, showing the mechanism under control of the operator at the receiving station—that is, the station at which the indications are to be registered. Fig. 6 is a section on the line 6—6 of Fig. 5, looking in the direction of the arrow. Fig. 7 is a detail showing one of the tape-controlling wheels employed in the transmitting apparatus shown in Fig. 1. Fig. 8 is a detail showing a metallic tape and its markings. Fig. 9 is a diagram showing the wiring for a single transmitting station and a single receiving station. Fig. 10 is a diagram showing the wiring for connecting a number of transmitting stations with a single receiving station.

My invention may be used in a great variety of relations and is applicable for the general purpose of measuring and indicating the depth of liquids, but in order to avoid prolixity, I will describe merely one representative form of the invention, to wit, one specially adapted for use upon shipboard for determining and indicating the depth of oil held in one or more tanks.

It will be understood that where there are several tanks the transmitting apparatus associated with each tank is merely a duplicate of that associated with the several other tanks.

I will first describe the transmitting mechanism, which is shown more particularly in Figs. 1, 2, 3 and 4. An oil tank is shown at 11 and contains a body of oil 12. A filling tube 13 extends upwardly from the tank and is used for introducing the oil. Another tube 14 extends upwardly from the tank, and the pipe 15, closed at its lower end, extends through the top of the tank and down nearly to the bottom thereof. The upper end of the tube 14 opens into the bottom of the casing 16. This casing is provided with a cover 17 having an opening 18 and underneath the cover is a glass plate 19, this glass plate together with the opening 18 constituting a window through which readings may be made at the transmitting station. The shafts 20, 21, are revolubly mounted within the casing and disposed parallel to each other. Rigidly mounted upon these shafts are pulleys 22 and 23 of the form shown more particularly in Fig. 7. Each of these pulleys is provided with radially disposed pins 22ª, and engaging the pulleys is a metallic band 24 of the form shown in Fig. 8. This metallic band is provided with holes 24ª, into which the pins 22ª are adapted to fit, so that gearing of the metallic tape relative to the pulleys 22, 23 is somewhat similar to a sprocket gearing. Mounted upon the lower end of the tape 24 is a hollow float 25, the specific gravity of which is sufficient to submerge the float in the oil 12, if the float is not otherwise supported. A counterbalancing weight 26 is suspended from the opposite end of the tape 24, however, and by its tendency to lift, the float 25, maintains the float partially submerged and partially exposed above the oil as indicated in Fig. 1. The pipe 15 is of sufficient length to allow the weight 26 a sufficient range of movement to correspond with the range of travel desired for the float 25. The lower end of the pipe 15 is closed and the weight 26 never touches the oil.

Mounted within the tank 11 are two guide members 27, 27', each consisting of a stranded wire. These guide members are provided with turnbuckles 28 and may by aid thereof be tightened up occasionally and thus maintained under a suitable degree of tension. The float 25 is provided with ears 29 each encircling the guide members 27 and 27' and thus maintaining the float in its path of travel while allowing it freedom of movement in a vertical direction as will be understood from Fig. 2. The metallic tape 24 (see Fig. 8) is provided with legends such as 2ᶠ, indicating entire feet; also with legends such as 2—1, 2—2, and 2—3, etc., indicating both feet and inches. The tape is also provided with graduations 24ᵇ, 24ᶜ, for carrying the refinements of measurements still farther, so as to enable the tape to indicate exceedingly slight differences in the position assumed by the float. A stationary pointer 24ᵈ enables the operator to determine with great accuracy the position of the tape as controlled by the float.

The shafts 20, 21, are supported upon ball-bearings 30. The casing 16 is provided with a partition 31, so that the pulleys 22, 23, and parts immediately associated therewith are located within a compartment 32 and the vapor of the oil from the tank is by the partition 31 prevented from permeating other parts of the casing. The partition 31 is provided with a screw hole 33 to facilitate fastening the cover 17 in position upon the casing.

A cylindrical drum 34 which for convenience I designate as a transmitting drum is mounted within the casing 16 and supported by aid of bearings 35 which are preferably ball-bearings. The drum is mounted rigidly upon a shaft 36 which extends through and is supported by these bearings. The drum is of insulating material, preferably hard rubber or fiber, and at one of its ends is provided with a contact ring 37 of metal or other conducting material. Engaging this contact ring is a contact brush 38 extending inwardly from a binding post 39. Secured to the drum 34 is a gear wheel 40, and meshing with the latter is a pinion 41 for turning the drum. The drum 34 carries a spiral winding 42 of resistance-wire of high resistance, the convolutions of which are separated and spaced uniformly. A contact brush 43 engages a single convolution of the resistance wire as will be understood from Fig. 3. The brush 43 is mounted upon a small carriage 44, the latter having approximate annular form as indicated in Fig. 4. Located within the carriage 44 is a ring 45 of insulating material, this ring being threaded internally and fitted upon a shaft 46, the latter being threaded externally for the purpose. The pinion 41 is rigidly mounted upon this shaft which is connected with the shaft 20 and forms practically a continuation of the same. The carriage 44 is provided with an arm 47, integral with it. A metallic stem 48 is mounted upon the arm 47 and insulated therefrom as will be understood from Fig. 4. This stem 48 may serve the purpose of a binding post. The lower end of the stem 48 carries a contact blade 49. A pair of contact springs 50 are located upon a block 51 of insulating material (see Fig. 4) this block being slidably mounted upon rods 52, 53, and adjustable relatively to the rod 53 by aid of nuts 54. By turning these nuts and thus adjusting the position of the block 51, the contact springs 50 may be moved bodily to the right or left as shown in Fig. 3. Another pair of contact springs 55 mounted similarly to the springs 50 are used in connection with nuts 56 and may also be adjusted relatively to the rod 53, which is threaded for facilitating the adjustment, above described, of both sets of contact springs 50 and 55.

The carriage 44 is provided with a downwardly extending arm 57 (see Fig. 4) carrying a pair of contact springs 58 which engage a contact rail 59, the latter being rigidly mounted upon a stationary strip 60 of insulating material. The following parts are in metallic communication and may be used as hereinafter described as part of an electric circuit: binding post 39, brush 38, contact ring 37, resistance wire 42, brush 43, carriage 44.

The purpose of the two pairs of contact springs 50 and 55 is to enable the carriage 44 when moved beyond a certain limit to the right or the left as the case may be according to Fig. 3, to make contact between the contact blade 49 (see Fig. 4) and the adjacent pair of contact springs 50 or 55 as the case may be. In doing this, a circuit may be completed through the contact springs 50 or 55 to an alarm bell or other appropriate indicating mechanism. This discloses the fact that the carriage 44 has reached a predetermined point in its travel, and consequently that the oil in the tank has reached a predetermined level.

I do not deem it necessary to show the circuits to the alarm bells or equivalent mechanisms as such circuits are very common in this art, and my invention, so far as the alarm mechanism is concerned, relates merely to the manner in which the contacts are made for the purpose of closing the circuit in question.

The circumference of the drum 34 is preferably one foot exactly, the gearing from the shaft 20 to the drum being such that one complete revolution of the drum corresponds to a difference of one foot in the level of the liquid in the tank.

The ohmic resistance of the resistance wire 42 is preferably one ohm to each complete convolution of the wire on the drum 34 so that one turn of the latter means a change in the ohmic resistance of the general circuit controlled by the transmitter of one ohm to each foot in the rise and fall of the liquid in the tank. I provide bearings 61, 62, 63, for supporting the shafts 46, 53.

As the level of the liquid in the tank rises and falls the position of the float varies, the tape 24 takes up corresponding positions and the operator may read off from the tape directly, as seen through the window, the quantity of oil in the tank as measured in feet, inches and fractions of an inch. Moreover, the rise and fall of the float causes the tape to actuate the pulleys 22, 23, and by turning the shaft 20 and various gear members above described, cause the rotation of the drum 34 and the movement of the slide 44 to the right or left as above described. When the level of the liquid in the tank reaches its predetermined limit the carriage 44 is brought in such position that the contact blade 49 makes connection with the contact springs 50 or 55, thus actuating an electric alarm as above described.

I will now describe the electrical indicating apparatus, which I conveniently call a receiver, and which is shown more particularly in Figs. 5 and 6. The casing 64 is provided with a cover 64ª, the latter being of insulating material. A metallic rod 65 is by aid of posts 66 supported rigidly upon the cover. A slide 67 is mounted upon the rod 65 and carries two metallic arms 68, 69, the latter being insulated from each other and from the rod 65. Annular nuts 70 hold these arms upon the slide. A handle 71 is mounted upon the slide and is used by the operator for manipulating the arms 68, 69.

Parallel with the rod 65 are two metallic strips 72, 73, shown in dotted lines in Fig. 5 for facilitating the connection of the arms 68, 69, with the line wires as hereinafter described. A number of contact members such as 74, 75, 76, 77, 78, are provided, there being two pairs of these contact members to each tank. The casing 64 is provided with a glass window 64ᵇ, to facilitate the readings to be obtained from the indicating cylinders 86ª which will be hereinafter more fully described.

Within the casing is a battery 79 which may if desired consist of a couple of dry cells. At 80, 81, are two keys having preferably the form of push buttons and used for closing certain circuits as hereinafter described. A galvanometer 82 is mounted centrally of the cover and may be of the type usually employed in connection with Wheatstone bridge measurements. This galvanometer is provided with the usual indicating pointer 83 and arcuate scale 84. Mounted also within the casing 64 are two resistance coils 85 which are used in balancing the resistances of the lines as hereinafter described, and are employed after the manner of the permanent resistance of a Wheatstone bridge.

Revolubly mounted within the casing 64 is a drum 86 and wound spirally upon the latter is a resistance wire 88. This wire is in many respects similar to the resistance wire 42 above described, corresponds with the latter as regards its length, ohmic resistance and the spacing of the convolutions, the drum 86 being of the same circumference as the drum 34.

Extending from the drum 86 and forming practically a continuation thereof is an indicating cylinder 86ª. This indicating cylinder is marked with parallel horizontal lines 87 and with a spiral line 89. The spiral line corresponds to convolutions upon the drum 34 at the transmitting station and, therefore, represents feet, whereas the horizontal lines 87 correspond to inches, and fractions thereof. The horizontal lines are provided with ends 90 which are so arranged as to facilitate exact disclosure of the positions of the cylinder and are adapted to enable the operator to find his readings quickly.

For the purpose of supporting the drum 86 and indicating cylinder 86ª, I use a shaft 91 which is mounted in ball-bearings 92. Upon one end of the indicating cylinder 86ª is a gear wheel 93 which meshes with a gear pinion 94. This gear pinion is mounted rigidly upon a revoluble threaded shaft 95, this shaft being supported in bearings 96, 97. A strip 98 of insulating material has a shape similar to that of the strip 60 (see Fig. 4) and similarly supports a contact rail, numbered 98ª. A slide 99 is always in metallic communication with the conducting rail 98ª, by a sliding connection like that shown in Fig. 4 between the carriage 44 and the rail 59. The slide 99 carries a contact brush 100 which engages the resistance wire 88. Another slide 101 engages the threaded shaft 95. This slide carries a pointer 102 which extends to the proximate middle of the indicating cylinder 86ª as will be understood from Fig. 5, and is adapted to define the position of the adjacent indicating lines 87 and 89.

From a binding post 86ᵇ extends a contact spring 86ᶜ, which engages a contact ring 86ᵈ carried by the drum 86. The following elements are always in metallic communication with each other: binding post 86ᵇ, contact spring 86ᶜ, contact ring 86ᵈ, resistance wire 88, contact brush 100, slide 99 and strip 98ª.

The threaded shaft 95 carries a bevel pinion 103 secured rigidly upon it. This bevel pinion meshes with a bevel gear wheel 104 which is mounted rigidly upon a shaft 105. This shaft carries a hand crank 106 secured rigidly upon it. The shaft 105 extends into a socket bearing 107 as will be understood from Fig. 6.

The operator by turning a hand crank 106 causes the gear wheel 104 to turn the shaft 95 and also causes the pinion 94 to turn the gear 93 thus rotating the drum 86 and indicating cylinder 86ª. Rotation of the shaft 95 causes the slides 99 and 101 to travel in the general direction of the axis of the shaft so that the pointer 102 moves along the indicating cylinder as the latter is rotated and the brush 100 moves along the drum 86, the contact brush 100 following the resistance wire 88 and being continuously in contact therewith. The operator, therefore, by turning the hand crank can cut in or cut out any amount of resistance from the resistance wire 88, and when this is done the indicating pointer 102 discloses upon the indicating cylinder 86ª a measurement corresponding to the relative movement of the brush 100 and the drum 86.

The operator by turning the hand crank as above described seeks to cut in or cut out so much resistance as will be necessary to cause the ohmic resistance offered by the drum 86 to correspond with and to balance the ohmic resistance offered by the drum 34 at the transmitting station. This being done, by attaining a balance with the modified Wheatstone apparatus first hereinafter described, the operator at the receiving station can readily read off, by aid of the indicating cylinder 86ª and pointer 102, the position of the drum 34 at the transmitting station and consequently the height of the float and therefore the depth of the oil at said transmitting station.

I will now describe the electric wiring for connecting the receiving and transmitting stations, reference being had for this purpose to Figs. 9 and 10. Fig. 9 shows diagrammatically the simple connections used for a single transmitting station and a single receiving station. Fig. 10 shows diagrammatically the connection for a single receiving station, which appears at the left, and a number of independent transmitting stations appearing at the right of the figure and each associated with an individual tank. A wire 109 extends from the receiving station to the several transmitting stations, and relatively to the latter may be considered as a bus wire; as will be understood from the right hand portion of Fig. 10. At the receiving station this wire is connected with the battery 79 within the casing 64 as above described. Connected with the bus wire 109 at the various transmitting stations are wires 110, 111, 112, 113, 114, which lead respectively to the several contact rails 59 within the respective casings 16 and are thus in metallic communication with the several brushes 43. For the sake of simplicity, the various electrical connections within the casing are omitted from the diagram, the various brushes 43 being here shown as in direct communication with the wires 110, 111, 112, 113 and 114. The several resistance windings 42 within the respective casings 16 at the transmitting station are connected through the contact rings 37 (see Fig. 3) brushes 38, binding posts 39 with various wires such as 115, 116, 117, and 118 as shown in Fig. 10. These wires together with other wires 119, 120, 121, 122, lead from the various transmitting stations to the central receiving station. Each wire 119, 120, 121, 122 is connected with one of the short wires such as 111, 112, 113 and 114 at the transmitting station, whereas the various wires 115, 116, 117 and 118 are in metallic communication with the respective resistance windings 42 in the diagram. For convenience I show the wires as directly connected, but it will be understood that the connections are made through the contact rail 59 and parts contiguous thereto as shown in Fig. 4 and above described. Two wires 123, and 124, at the receiving station shown in Fig. 5, are by aid of binding posts 72ª and 73ª connected directly with the contact arms 68 and 69.

The distribution of the contact members 74, 75, 76, 77, 78 and others of their kind (see Fig. 5) is such that by handling the slide 67 as above described a pair of contact members such as 77 may be brought into metallic communication through the arm 68 and at the same time another pair of contact members such as 78 may be brought into metallic communication with each other through the short switch arm 69. To accomplish this purpose the operator grasps the handle 71 and by its aid rocks the slide to disengage the arms 68 and 69; the operator then pushes the slide in the general direction of the length of the rod 65 and by aid of the handle rocks the slide back thus bringing the contact arms 68, 69, into engagement with the respective pairs of contact members to be brought into metallic communication with each other. For instance, the contact members 74 may be brought into contact with each other and at the same time the contact members 75 may be brought into communication.

At the receiving station, one of the windings 85 is connected with the wire 124, which leads to the strip 72; also with the wire 125, the latter leading to the galvanometer 82. From this galvanometer a wire 126 leads to the switch 80 and from the latter a wire 127 leads to the other winding 85. A wire 123 (see Fig. 10) leads from the strip 73 to the contact rail 98$^a$. The resistance winding 88 is connected with the wire 127 and the last mentioned winding 85. Both of the windings are connected with a wire 128 which leads to the switch above mentioned and from the latter a wire 129 leads to the battery 79,—all of these parts as above explained being associated with the casing 64 at the receiving station.

The operation of my device is as follows: Suppose that a single transmitting station and a single receiving station are connected up as indicated in Fig. 9, and as above described. The parts being properly adjusted, and oil being in the tank, the float occupies a position high or low according to the volume of oil contained. The metal tape occupies a corresponding position and the operator at the transmitting station by a glance at the tape can determine accurately the amount of oil in the tank as measured in terms of feet, inches and fractions of an inch. If now the operator at the receiving station wishes to determine the amount of oil, he turns the hand crank 106 as above described and presses upon the keys 80, 81. He now notes the deflection, if any, of the galvanometer pointer 83, and by turning the hand crank to the right or left as the case may be, he causes the two parts of the line to balance electrically, so that the pointer of the galvanometer takes up its neutral or normal position. This being done, the operator reads off from the indicating cylinder the number of feet and inches and fractions of an inch representing the depth of oil in the tank at the transmitting station. It will be noted that when by turning the hand crank he brings the galvanometer into equilibrium, the resistance of the coil 88 at the receiving station will equal the resistance of the coil 42 at the transmitting station, the circuits thus completed are as follows: battery 79, wire 109, resistance coil 42, wire 124, to receiving station where the current divides; a portion passes through the winding 85, and wire 129, back to battery 79. From the contact members 78, a portion of the current branches off and passes through the wire 123, resistance coil 88, and resistance winding 85, wire 129, back to battery 79. As the two windings 85 are of equal resistance and as the effective portions of the windings 88 and 42 are also of equal resistance no current now passes through the wires 125, 126 and the galvanometer 82. The galvanometer will show a deflection, however, unless and until the rotation of the hand crank brings the resistance winding 88 to equal the resistance winding 42.

Where a single receiving station is used in connection with a number of separate transmitting stations as indicated in Fig. 10, the operation is substantially the same as that just described with the exception that the various transmitting stations are brought into play independently of each other and one at a time. This is done as above described by the operator shifting the slide 67 (see left of Fig. 5) into different relative positions for the purpose of connecting up various paths of the contact members 74, 75, 76, 77, 78, etc. In any event, the current from the battery divides a portion passing through a resistance winding 88. These two portions balancing each other and the two branches of the current thus balanced against each other pass around the galvanometer 82 and through the switches 80, 81, back to the battery 79. This being done, there is no deflection of the galvanometer and in order to accomplish this result it is necessary, as before, for the operator to turn the hand crank into such position that the resistance of the resistance coil 88 is equal to that of the resistance coil 42 of the particular transmitting station affected.

Where several transmitting stations are used with a single receiving station and an indication is being made, the following circuits may be traced: battery 79 at receiving station, wire 109 to transmitting stations, wire 113, brush 43 and its immediate connections, resistance winding 42, wire 117 to receiving station, contact member 78, contact arm 69, another contact member 78, strip 72, wire 124, whence the current divides; a portion passes through one of the windings 85, wire 128, switch 81 and wire 129 back to battery 79; another portion leaving the wire 124 passes through the wire 125, galvanometer 82, wire 126, switch 80, wire 127, the adjacent winding 85, thence uniting with the first mentioned portion of the current, passes through wire 128, switch 81, and wire 129 back to battery 79. Another circuit may be traced as follows: battery 79, wires 113, 121 and contact members 77; contact arm 68, another contact member 77, strip 73, wire 123, contact rail 99$^a$, brush 100, resistance winding 88, adjacent winding 85, wire 128, switch 81 and wire 129 back to battery 79.

It will be noted that any change in the resistance of any line wire is neutralized and compensated for and by a corresponding change in the companion line wire. In other words, as the line wires are always in pairs a heating or cooling of one wire is always accompanied by a similar heating or cooling of the companion wire. Changes of temperature, therefore, can have no effect upon the measurements. Where the apparatus is used upon shipboard the receiving station may be located in the engine room, the log room, or the store room. The coils 85 may be standard resistance coils of fifteen ohms each if desired. In practice, the operator at the receiving station finds it convenient to make the electrical connections, push the keys 80, 81, and note the deflection indicated by the galvanometer. From this deflection he understands that the crank handle 106 is to be turned and upon turning it, he finds that the deflection decreases to zero. For a deflection in one direction, he turns the handle in one way, and for a deflection in the other direction he turns the handle in the reverse way. The extent of rotation of the handle is thus indicated by the galvanometer. The reckonings may be made in a surprisingly short time.

I will assume, for an example, that the operator is at the receiving station and wishes to ascertain the depth of oil in the tank, which is at the transmitting station. I will also assume that the depth of oil to be ascertained is three feet, six and a quarter inches. Of course, the depth is indicated on the tape at the transmitting station, but at the receiving station the operator has no knowledge of such depth. After connecting up the wiring for the particular tank in question and pressing upon the galvanometer key, the operator watches the galvanometer needle. If it deflects toward the legend More, he turns the handle 106 in the direction of rotation thus indicated by the needle. If, however, the needle deflects toward the legend Less, he turns the handle in the reverse direction. He simply holds the galvanometer key down and turns the handle to the right or left until the galvanometer needle takes up a neutral or central position. This being done the pointer 101 is in such position as to indicate, upon the adjacent scale, three feet, six and a quarter inches. Moreover, the portion of the resistance wire 88 carried by the drum and now serving as a conductor in the electric circuit measures three feet, six and a quarter inches.

As the two pairs of contact springs 50, 55 are adjustable in a direction parallel with the path of travel of the carriage 44, the operator can at will adjust the high level and low level alarms to be energized whenever the liquid in the tank reaches any desired predetermined high or low level.

I do not limit myself to the precise apparatus shown and above described, which is to be considered merely as a representative form of my invention.

What I claim is,—

1. In a telemetric system, a main line, an exciter in said line, a pair of branch circuits in parallel in said main line, equal constant resistances in each of said branch circuits, a measuring instrument across the branch circuits, and a variable resistance in each of said branch circuits, said variable resistances each comprising a drum, a resistance wire wound spirally upon each of said drums, variable mechanism for rotating one of said drums, manual means for rotating the other of said drums, a movable contact for each of said drums engaging the respective resistance wires thereof and having connection with the variable mechanism and the manual means respectively, whereby to automatically position one of said contacts upon the respective drum by the variable mechanism and whereby the second contact may be manually adjusted with respect to the second drum.

2. In a telemetric system a main line, an exciter in said line, a pair of branch circuits in parallel in said main line, equal constant resistances in each of said branch circuits, and a variable resistance in each of said branch circuits, said variable resistances each comprising a drum, a resistance wire wound spirally upon each of said drums the convolutions of which are spaced apart and each convolution having a resistance of one ohm, variable mechanism for rotating one of said drums, manual means for rotating the other of said drums, a movable contact for each of said drums engaging the respective resistance wires thereof and having connection with the variable mechanism and the manual means respectively, whereby to automatically position one of said contacts upon the respective drum by the variable mechanism and whereby the second contact may be manually adjusted with respect to the second drum.

In testimony whereof I have hereunto set my hand in presence of two subscribing witnesses.

ARTHUR J. SMITH.

Witnesses:
CHAS. E. PALMER,
CYRUS W. LONGLEY.